US006038799A

United States Patent [19]

Havens et al.

[11] Patent Number: 6,038,799

[45] Date of Patent: Mar. 21, 2000

[54] INDEXING SYSTEM FOR CHANGEABLE SIGNS

[76] Inventors: Dale I. Havens, 11101 Devils Lake Hwy., Addison, Mich. 49220; Michael R. Atkinson, 400 CR 705, Jonesboro, Ark. 72401

[21] Appl. No.: 09/198,706

[22] Filed: Nov. 24, 1998

[51] Int. Cl.[7] .................................................. F16H 27/08

[52] U.S. Cl. .............................. 40/505; 74/435; 74/411.5

[58] Field of Search ................................ 40/505; 74/435, 74/411.5

[56] References Cited

U.S. PATENT DOCUMENTS

| | | |
|---|---|---|
| 1,461,047 | 7/1923 | Ray . |
| 1,785,204 | 12/1930 | Nelson et al. . |
| 1,865,725 | 7/1932 | Raves . |
| 5,161,421 | 11/1992 | Stigsson . |
| 5,511,330 | 4/1996 | Havens . |

*Primary Examiner*—Cassandra H. Davis
*Attorney, Agent, or Firm*—Young & Basile, P.C.

[57] ABSTRACT

An indexing system for signs consisting of a plurality of indicia bearing vane faces wherein the vane faces are sequentially exposed to view in the manner of a "wave", such sequential revealing of the sign vane faces generating interest in the sign's message. Each sign vane is rotated by a transmission and the transmissions are interconnected in such a manner as to sequentially operate the vanes to produce the "wave" action and detents associated with each transmission lock the sign vane in the desired position.

3 Claims, 1 Drawing Sheet

FIG. 1
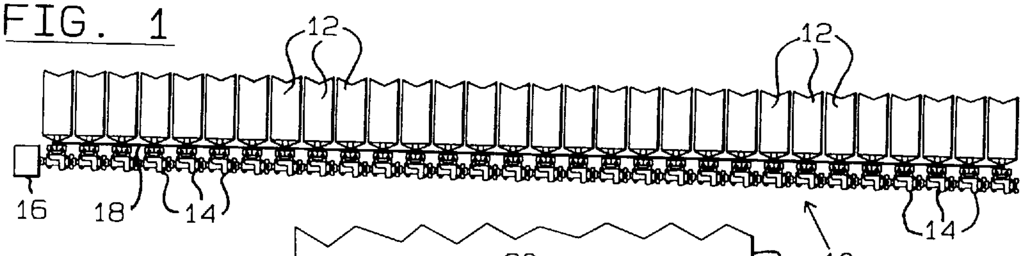
FIG. 2
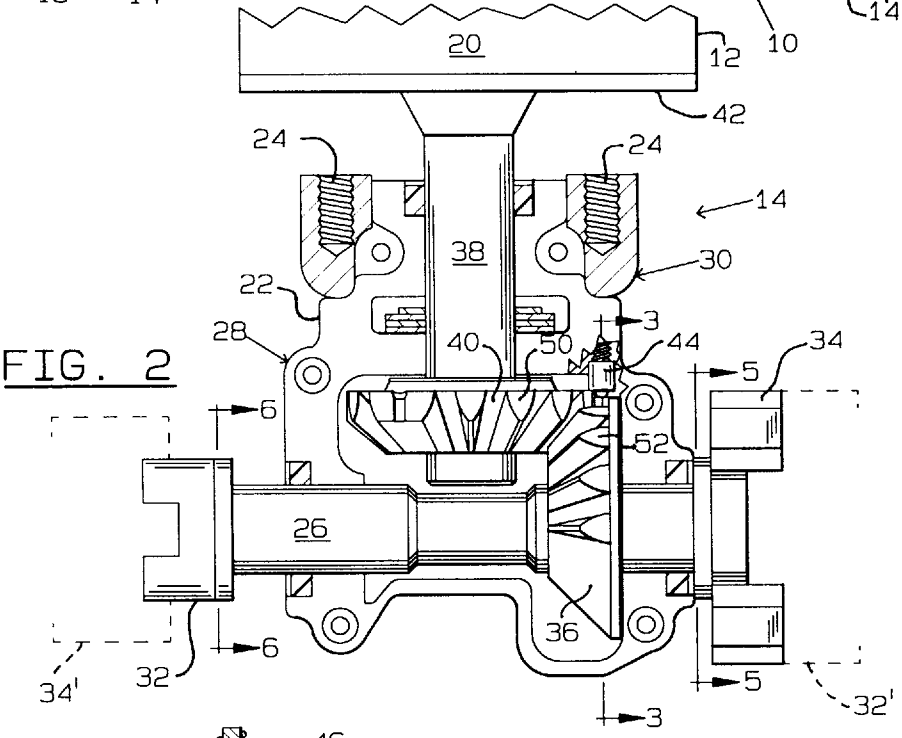
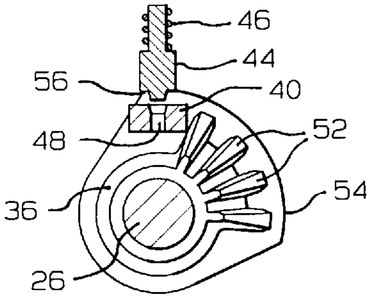
FIG. 3
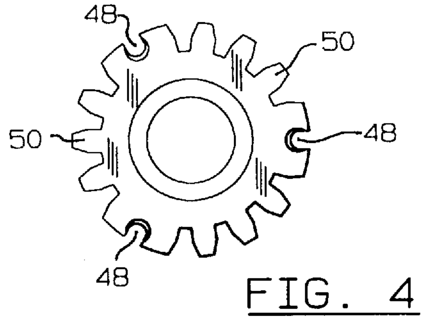
FIG. 4
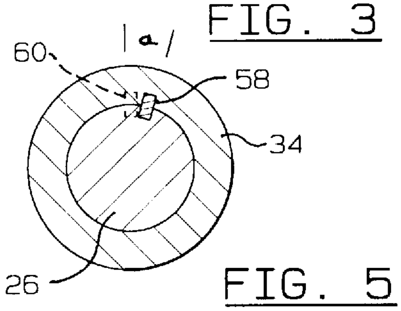
FIG. 5
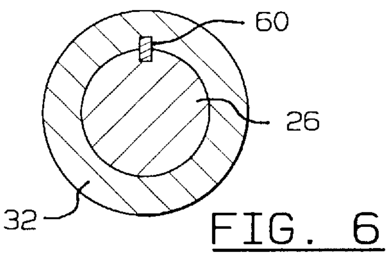
FIG. 6

INDEXING SYSTEM FOR CHANGEABLE SIGNS

BACKGROUND OF THE INVENTION

1. Field of the Invention

The invention pertains to vane type indexable signs and transmissions therefor which permit sequential vane operation.

2. Description of the Related Art

Changeable signs of large dimension consisting of a plurality of side-by-side vanes, usually vertically oriented, wherein the complete sign face is defined by the combination of vane faces have been used for some time as evidenced by U.S. Pat. Nos. 1,461,047; 1,785,204; 1,865,725 and 5,161,421. Changeable signs of this type mount a plurality of vanes, usually three in number, on a single sign support shaft which is sequentially indexed through 120° of rotation to permit three different sign faces to be sequentially visible for each complete revolution of the sign support shaft. Usually, all of the vanes constituting the sign are simultaneously rotated wherein the entire sign face will be simultaneously changed, and three related or unrelated sign faces can be operated by the same mechanism.

With changeable vane type signs of this type, a transmission is normally utilized with each set of vanes commonly mounted upon a sign support shaft. As the transmissions constituting the sign vane supports are interconnected such as shown in U.S. Pat. No. 5,511,330, all of the vanes constituting the sign are normally rotated simultaneously.

In order to generate interest in the sign's message, it is desirable to sequentially rotate the adjacent vanes whereby the sign message is revealed sequentially or in a "wave" manner, and previously, sign operating mechanism to produce a wave action and yet maintain each vane in a stationary locked manner during viewing has not been available.

OBJECTS OF THE INVENTION

It is an object of the invention to provide a changeable indexable sign consisting of a plurality of rotatable vanes wherein the vanes may be sequentially revealed with a smooth action and are operated by a single power source, the timing of the operation of adjacent vanes being closely regulated.

It is another object of the invention to provide a changeable indexable sign wherein a plurality of sign vane transmissions mounted in a side-by-side relationship are interconnected through a drive system which insures the proper sequential sign vane operation, and produces a smooth and pleasing sign revealing action to the observer.

Yet another object of the invention is to provide a changeable sign wherein the sign is formed by a plurality of vanes, each vane having its own transmission, and adjacent transmissions being interconnected, and the shafts supporting the sign vanes being selectively locked by a detent when the proper sign orientation is achieved.

SUMMARY OF THE INVENTION

An indexable changeable sign utilizing the concepts of the invention consists of a plurality of transmissions mounted in side-by-side relationship wherein each transmission includes a drive shaft extending therethrough and a sign vane support shaft which is transversely related to the drive shaft. Within the transmission, the sign support shaft includes a complete circular gear, and a gear segment mounted upon the drive shaft includes only a few teeth for rotating the sign support shaft a portion of a revolution during each revolution of the drive shaft. If three vanes are mounted upon the sign support shaft, the indexing gear segment will rotate the sign support shaft 120° for each 360° rotation of the drive shaft. A detent system locking the sign support shaft against rotation is unlocked by a detent operator mounted upon the segmented gear such that the sign support shaft will be locked against rotation intermediate indexing movements.

The type of transmission with which the invention is utilized is fully described in U.S. U.S. Pat. No. 5,860,325, which is incorporated herein by reference.

It is the intent of the inventive concept to interrelate the transmissions in such a manner that adjacent sign vane faces will be sequentially viewable wherein the entire sign is revealed in a "wave" type motion for attracting the attention of the observer, and causing the observer to pause until the entire sign is visible. To achieve this result, the drive between adjacent transmissions is angularly varied so that even though the transmission drive shafts will be rotating at a constant rotative speed, the rotation of the sign support shafts are sequentially related to produce the desired staggered operation of the sign support shafts to sequentially reveal the vane faces constituting the sign.

This sequential wave action of the transmissions is achieved by angularly orienting the couplings between adjacent transmissions in a manner proportional to the number of vane faces on the each transmission, and the number of transmissions creating the entire sign. In the disclosed embodiment, the transmission drive shaft couplings adjacent each other are angularly oriented with respect to the axis of drive shaft rotation by an angle equaling 360° degrees divided by the number of transmissions constituting the sign times the number of vane faces supported by each transmission sign support shaft. For instance, if 30 transmissions are used to define the changeable sign, and each transmission sign support shaft supports three vanes, then each drive shaft will be displaced relative to the drive shaft through which it is being powered. Accordingly, as it is desired that each vane support shaft rotate 120° to reveal the entire sign, the increment between adjacent transmissions permits all 30 transmissions and vane support shafts to be rotated during the 120° rotation of the vane support shafts, and the locking detents will maintain the vane support shafts in the proper orientation at the completion of the sign changing process.

The utilization of the concepts of the invention permits a pleasing smooth rotation of the sign vanes to produce a sequential wave type revealing of the vane faces and upon the detents fixing the vane sign support shafts after indexing, the vanes will maintain their proper orientation and not be adversely affected by the wind.

BRIEF DESCRIPTION OF THE DRAWINGS

The aforementioned objects and advantages of the invention will be appreciated from the following description and accompanying drawings wherein:

FIG. 1 is a partial elevational view of a plurality of transmissions and vanes constituting a changeable sign utilizing the concepts of the invention, FIG. 2 is an elevational partially sectional view of a transmission using the concepts of the invention, FIG. 3 is a detail elevational sectional view of the detent as taken along Section 3—3 of FIG. 2, FIG. 4 is a top plan view of the vane sign support shaft gear, per se, FIG. 5 is an elevational sectional view taken through a coupling key along Section 5—5 of FIG. 2, and FIG. 6 is an elevational sectional view taken through the coupling key along Section 6—6 of FIG. 2.

DESCRIPTION OF THE PREFERRED EMBODIMENT

With reference to FIG. 1, a complete changeable sign of the type incorporating the invention is represented at 10 consisting of a plurality of sets of vanes 12, each set of vanes being mounted upon a transmission gear box 14 for rotating the vane set. The transmissions are rotated by an electric motor 16, and the transmissions are mounted upon a support plate 18 in side-by-side relationship.

In the disclosed sign 10, thirty sets of vanes 12 are illustrated along with thirty transmissions 14. As will be later appreciated, all of the transmissions 14 are interconnected whereby the motor 16 sequentially operates all of the transmissions 14 in view of their interconnection of drive shafts, as later explained.

Each of the vanes 12 of a vane set includes a face 20 upon which the indicia constituting a portion of the sign appears. The vanes 12 are oriented in a side-by-side vertical manner with little spacing between adjacent vanes so that the overall total effect is a sign having a width equal to the sum of the vane widths, and a height equal to the vane height. Usually, three vanes 12 are mounted upon a common platform which is rotated by a single transmission 14. When three vanes are utilized as a set, they will be triangularly oriented to each other. If two vanes constitute a set, the faces thereof are in back-to-back relationship, while if four vanes constitute a set, the vanes will be arranged in a square configuration wherein adjacent faces are 90° with respect to each other. The entire sign is viewable in its completed form when the vane faces 20 constituting a single sign are in a co-planar relationship, and when the vane faces are co-planar, the faces of the other vanes of the set are not visible to the observer.

With reference to FIG. 2, the transmissions 14 include a housing 22 having threaded holes 24 defined therein for receiving fasteners, not shown, which permit the housings 22 to be attached to the underside of the support plate 18 by bolts, not shown.

Each of the transmissions 14 includes a drive shaft 26 extending therethrough as to extend from the transmission housing left side 28, as viewed in FIG. 2, and the housing right side 30. At its left end, the drive shaft 26 has a coupling 32 keyed thereto, while the right drive shaft end has a coupling 34 keyed thereto. Each transmission is drivingly connected to its adjacent transmission such that the coupling 32 engages the right coupling 34' of the transmission located on the left, FIG. 2, not shown, while the right coupling 34 will be in driving relationship to the left coupling 32' of the transmission mounted upon the right side of the transmission housing 22 in the manner shown in U.S. Pat. No. 5,511,330.

Within the housings 22, a partial gear 36 is mounted upon the drive shaft 26 for rotation therewith, and the gear 36 selectively drives the vane sign support shaft 38 which is transversely related to the axis of the drive shaft 26. Usually, the vane sign support shaft 38 will be perpendicularly disposed, and at its lower end within the transmission housing 22, a circular gear 40 is affixed thereto.

The vane sign support shaft 38 extends from the housing 22 and a vane platform 42 is mounted thereon upon which the associated set of vanes 12 are supported whereby rotation of the vane support shaft 38 causes the set of vanes 12 to also rotate. The upper ends of the vanes 12 are supported in bearings, not shown, as is conventionally known.

A detent 44 is movably mounted within a cylindrical recess within housing 22 and is biased downwardly by the spring 46, FIG. 3. As will be appreciated in FIG. 4, the circular gear 40 fixed to the vane sign support shaft 38 includes a plurality of detent receiving openings 48 equally spaced thereabout, in the disclosed embodiment 120° apart, for selectively receiving the detent 44 and preventing rotation of the vane sign support shaft 38. The detent openings 48 are located intermediate the teeth 50 of the gear 40 and selectively mesh with the teeth 52, FIG. 3, defined on the partial gear 36 affixed to the drive shaft 26. The partial gear 36 includes a circular cam surface 54 which selectively engages the detent cam surface 56 to raise the detent from its openings 48 prior to the teeth 52 engaging the teeth 50 of the vane sign shaft support gear 40. In this manner, the detent 44 is released from the gear 40 permitting partial rotation of the gear 40 by gear segment 36.

The aforedescribed operation of the sign structure is similar to that disclosed in U.S. Pat. No. 5,860,325, and the disclosure of this patent is herein incorporated by reference.

It is desired that the visible faces 20 of the vanes 12 constituting a complete sign be sequentially revealed to the observer in a "wave" manner. For instance, the vane 12 at the left of the sign 10 begins rotating to a new face slightly before the vane immediately to its right begins rotating, and sequentially, the vane faces will be revealed from the right to the left. This sequential revealing of the next vane face 20 the the right in a wave manner will entice the curiosity of the viewer causing the viewer's attention to remain on the sign 10 until all of the vanes constituting a complete sign are visible and the sign becomes comprehensive in its entirety.

In order to achieve this sequential wave operation of the vanes 12 and the transmissions 14, the angular orientation of the coupling 32 on the drive shaft 26 is slightly varied with respect to the angular orientation of the coupling 34 on the drive shaft. This angular difference herein defined as $\alpha°$ is represented in FIG. 5. FIG. 5 is a section as taken through the right coupling 34, FIG. 2, and the key 58 is located within grooves defined in the drive shaft 26 and the coupling 34 prevent relative rotation between the coupling 34 and the drive shaft 26. In a similar manner, as shown in FIG. 6, the left coupling 32 on the drive shaft 26 is keyed thereto by key 60 received within close fitting slots in the drive shaft 26 and the coupling 32.

The sections shown in FIGS. 5 and 6 are taken at the same angular orientation of the drive shaft 26, and in FIG. 5, the key 60 of coupling 32 is shown in dotted lines, and the angular offset between keys 58 and 60 is represented by the angle $\alpha$.

In order to determine the angle $\alpha$, the formula $$\alpha = \frac{360° - \dfrac{(360°)}{(N.F.)} - (M \times N.F.)}{N.G.}$$

is used wherein N.G. equals the number of transmission gear boxes 14 and N.F. equals the number of vane faces constituting the set of vanes 12 rotated by a single transmission, M is the angular over ride of the drive motor as it stops and 360° is one revolution of the input drive shaft. Hence, in a conventional construction wherein three vanes 12 are mounted upon each transmission 14, and thirty transmissions are used to constitute a sign 10, and wherein there is a 1° over ride due to stopping of the drive motor, the angle α will be $$\alpha = \frac{360^\circ - \frac{(360^\circ)}{(3)} - (1^\circ \times 3)}{30} = 7.9^\circ$$

If only two vanes 12 are mounted upon a transmission, α will equal 5.93°, and if four vanes 12 are mounted upon a transmission, α will equal 8.87°.

The circumferential length of the cam surface 54, FIG. 3, is such that the cam surface 54 will engage the detent surface 56 and lift the detent 44 prior to the partial gear teeth 52 engaging the teeth 50 of the circular gear 40 driving the vane sign support shaft 38. Thus, with the detent 44 lifted from its previously aligned detent opening 48, the vanes 12 will begin rotating due to their interconnected drive shafts, and in a three vane set, the 7.9° difference between adjacent transmissions 14 will sequentially reveal the vane surfaces from the left side of the sign 10, FIG. 1, to the right. Because there is a 7.9° difference in the angular rotation between each transmission during movement, the number of teeth 52 are such as to rotate the vane sign support shaft 38 and gear 40 through 120° of rotation, and the length of the cam surface 54 is such that the leftmost transmission 14, FIG. 1, detent 44 will engage a detent opening 48 in gear 40 after each vane support shaft 38 has rotated 120° to expose a new face 20 to complete the sign appearance. It is to be appreciated that the cam surface 54 is of sufficient length to permit the unlocking of detent 44, and while engaging gear segment 52 to rotate gear 50 the desired amount, then engage the detent 44 in gear 50, sequentially along the set of transmissions until all thirty of the vane sets and transmissions to be fully rotated, the detents 44 lock the transmissions in order to prevent rotation of the vane sign support shafts 38 due to wind engaging the vanes.

It is appreciated that various modifications to the inventive concepts may be apparent to those skilled in the art without departing from the spirit and scope of the invention.

What is claimed is:

1. An indexing system for changeable signs comprising, in combination, a plurality of transmissions mounted in side-by-side relationship, each transmission including first and second sides, a drive shaft having an axis of rotation and an angular override during ceasing rotation, a shaft input end located on said first side of said transmission and a shaft output end located on said second side of said transmission, a sign support shaft rotatably mounted on each transmission supporting a plurality of sign vanes and having a length transverse to the associated drive shaft and having a circular gear having teeth, a partial index gear mounted on said drive shaft for rotation therewith engaging with said circular gear during each rotation of said drive shaft producing a predetermined partial rotation of said sign support shaft determined by the number of sign vanes mounted on said sign support shaft, said sign vanes supported on said sign support shaft each having a selectively visible indicia face visible during each partial rotation of said sign support shaft, a first coupling mounted on said drive shaft input end, a second coupling mounted on said drive shaft output end, said first coupling of a given transmission being in driven engagement with said second coupling of an adjacent transmission and said second coupling of said given transmission being in driving engagement with said first coupling of the other adjacent transmission, and means affixing said first and second couplings mounted on a common drive shaft to produce an effective drive shaft angular difference of α° between adjacent transmissions wherein $$\alpha = \frac{360^\circ - \frac{(360^\circ)}{(N.F.)} - (M \times N.F.)}{N.G.}$$

where N.G. is the number of transmissions used in the changeable sign, N.F. is the number of sign vanes mounted on a common sign support shaft and M is the angular over ride of said drive shaft each time it is stopped.

2. In an indexing system for changeable signs as in claim 1 wherein said means affixing said first and second couplings to said common drive shaft comprises keys received within slots defined in said couplings and said common drive shaft.

3. In an indexing system for changeable signs as in claim 1, detent means locking said sign support shaft against rotation at predetermined rotative positions of said sign support shaft, and detent operating means mounted upon said drive shaft releasing said detent means during rotation of said sign support shaft.

* * * * *